Figure 2:
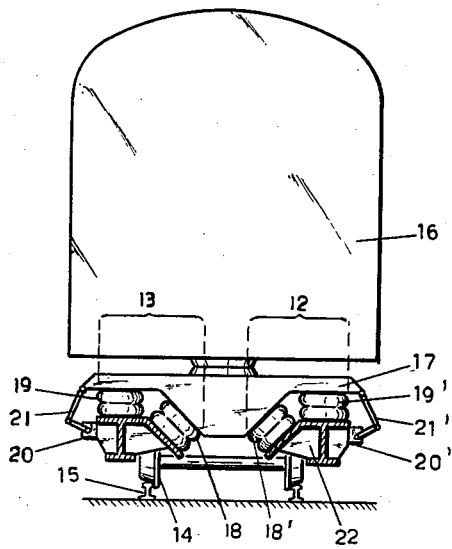

Sept. 24, 1963   F. G. VAN ZIJP ET AL   3,104,622
SUSPENSION RESPONSIVE TO HORIZONTAL AND
VERTRICAL MOVEMENTS OF A VEHICLE BODY
Filed Dec. 8, 1961

INVENTORS
FREDERiK G. VAN ZiJP
JAN MOLENAAR
BY
ATTORNEYS

United States Patent Office 3,104,622
Patented Sept. 24, 1963

3,104,622
SUSPENSION RESPONSIVE TO HORIZONTAL AND VERTICAL MOVEMENTS OF A VEHICLE BODY
Frederik G. Van Zijp, The Hague, and Jan Molenaar, Amsterdam, Netherlands, assignors to Werkspoor N.V., Amsterdam, Netherlands, a company of the Netherlands
Filed Dec. 8, 1961, Ser. No. 158,007
Claims priority, application Netherlands Feb. 24, 1959
2 Claims. (Cl. 105—199)

The invention relates to a suspension for a vehicle comprising at least four pneumatic suspension units or four groups of pneumatic suspension units for supporting the vehicle body which to a certain extent is free to move in horizontally transverse and vertical direction relative to the wheeled carriage and is a continuation-in-part of application Serial No. 9,756, filed February 19, 1960, now abandoned. Suspensions of this kind suffer the drawback that, unless the four groups of suspension units are pneumatically interconnected they can exert unequal supporting forces. This may cause the body of the vehicle to come under torsional strain. Furthermore, the fact that under such circumstances the separate wheels are differently loaded causes the set of wheels in the case of railroad vehicles to be asymmetrically adjusted in the track, which unfavourably affects the wear and travelling quality. With the object of eliminating these disadvantages it has been proposed already to pneumatically interconnect two suspension units or groups of suspension units lying in one and the same transverse plane with respect to the vehicle and to control them by mean of a single adjusting device. A possibly occurring unequal load of the vehicle will then be taken up by the remaining suspension units or groups of suspension units. Said embodiment however, presents the drawback that the vehicle is twice as strongly predisposed to perform a lateral rolling movement since the interconnected suspension units can not exert a counteracting rolling moment.

The object of the invention is to overcome the aforementioned disadvantages. According to the invention this is achieved in that means are provided for controlling the height of each suspension unit individually and that each suspension unit or at least one suspension unit of each group of suspension units is set at an angle, such that of each pair of suspension units, located in a plane extending perpendicular to the longitudinal axis of the vehicle, the axes are intersecting. Owing to this construction the reactive forces of the suspension units will yield a resulting free force exerted on the body of the vehicle and which can not be compensated by a similar reaction of the other suspension units. The body of the vehicle will in response thereto change its position until a new position of equilibrium is reached.

A particularly suitable embodiment is obtained, when according to the invention a control device is provided for adjustment of the reactive forces of the suspension units, said device, comprising an actuating element connected to the vehicle body so that said device acts in response to a change of position of the vehicle body as caused by the free forces which occur as a result of the reactions of the suspension units.

Figure 1:
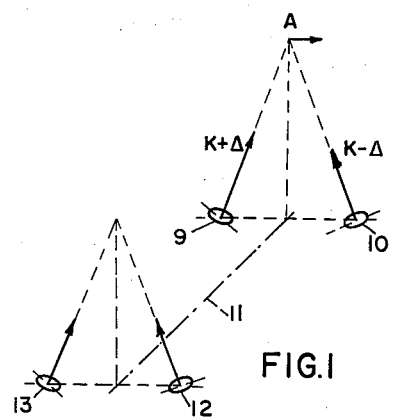

The invention will now be elucidated with reference to the drawings, in which:

FIG. 1 schematically illustrates the forces occurring in the case of an embodiment according to the invention, and FIG. 2 is an end view of a vehicle according to the invention.

In a conventional arrangement the vehicle body is supported by pneumatic suspension units each disposed vertically at a corner of the body and controlled by means of an adjusting device. Said adjusting device comprise valve means actuated by the movements of the vehicle body through the intermediary of a linkage. Said valve means are adapted to introduce pressure fluid from a tank into the suspension units and to discharge fluid from said units. Now, with this known arrangement it is quite possible that the body of the vehicle is at the correct level, but that the suspension units exert unequal forces. When the diagonally opposite suspension units are overloaded to the same extent, the remaining suspension units will present the same underload. As a result thereof the body will be subjected to torsional strain.

In another conventional arrangement, the suspension units at one end of the vehicle body are pneumatically interconnected so that they will at all times exert reactive forces of equal magnitude. Hence, with this arrangement a possibly occurring uneven distribution of the load must be taken up completely and solely by the suspension units at the other end of the body. The predisposition to perform a lateral rolling movement, however, is with this arrangement twice as strong as compared to the first described arrangement, since the suspension units at said one end of the vehicle are unable to exert a counter acting reactive rolling movement.

With the embodiment according to the invention illustrated in FIG. 1, the suspension units 9 and 10 are set at an angle in a plane which is substantially perpendicular to the longitudinal axis 11 of the vehicle. The suspension units 12 and 13 are likewise set at an angle in a plane which is substantially perpendicular to the axis 11.

If, with this embodiment the suspension units 9 and 10 exert reactive forces of different magnitude $K+\Delta$ and $K-\Delta$, then this means, that in the intersecting point A of the reactive forces of the suspension units will occur a horizontal free force which can not be compensated by a similar reaction of the set of suspension units 12 and 13. The body of the vehicle will now in response to said free force change its position until a new position of equilibrium is reached.

This change of position of the vehicle body relative to the wheeled carriage may be utilised to furnish an impulse to an adjusting device, which, thus actuated, may by adjusting the reactions of the suspension units effect the return of the body to its initial position.

An embodiment of a vehicle embodying said feature is shown in FIG. 2. The vehicle runs by wheels 14 on a railway track 15. The vehicle body 16 through the intermediary of a cross member 17 is supported at each end on a wheeled carriage 22 by groups 12 and 13 which each comprise two pneumatic springs 18 and 19 or 18' and 19' constituted by elastic bellows. Of each group, the spring 18 is set at an angle and spring 19 has a vertical position. The cross member 17 of the vehicle body at each end is connected to the actuating member of the adjusting devices 20 and 20' by a linkage 21 and 21', respectively. The adjusting devices 20 and 20' may be conventional and in the form of valve means controlling the flow of pressure fluid from a tank to and from the pneumatic springs.

The suspension system according to the invention presents the advantage that a statically undetermined moment of torsion about the longitudinal axis of the body of the vehicle, such as may occur with the described conventional arrangement, is prevented, while four free suspensions may still be relied upon. Finally it is to be noted that also the drawbacks are removed by the invention of the described conventional arrangement in which the suspension units at one end of the vehicle are pneumatically interconnected.

What we claim is:

1. A suspension for a vehicle comprising a vehicle body, a wheeled carriage, at least four pneumatic suspension units, one near each corner of the body, supporting the vehicle body on the wheeled carriage so as to allow said body to freely move relative to said carriage in both horizontal and vertical directions, each of said suspension units being set at an angle and disposed in pairs at the opposite ends of the vehicle with each pair located in a plane extending perpendicular to the longitudinal axis of the vehicle and with the axes of each pair intersecting, and means individually controlling the pressure of each suspension unit and responsive to horizontal and vertical movements of the body to automatically compensate for such movements.

2. A suspension for a vehicle comprising a body, a wheeled carriage, at least four pneumatic suspension units, one at each corner of the vehicle body, supporting the body on the wheeled carriage so as to allow said suspended body to freely move relative to said carriage in both horizontal and vertical directions, each of said suspension units being set at an angle and disposed in pairs with each pair located in a plane extending perpendicular to the longitudinal axis of the vehicle and with the axes of each pair intersecting, and means for individually controlling the pressure of each suspension unit and responsive to horizontal and vertical movements of the body to automatically compensate for such movements, said means being provided with actuating elements connected to the vehicle body.

References Cited in the file of this patent
UNITED STATES PATENTS

| | | |
|---|---|---|
| 2,908,230 | Dean | Oct. 13, 1959 |
| 2,968,258 | Lich | Jan. 17, 1961 |